United States Patent [19]

Furuta

[11] Patent Number: 5,206,281
[45] Date of Patent: Apr. 27, 1993

[54] THERMOPLASTIC RESIN COMPOSITION

[75] Inventor: Motonobu Furuta, Tsukuba, Japan

[73] Assignee: Sumitomo Chemical Company, Limited, Osaka, Japan

[21] Appl. No.: 496,665

[22] Filed: Mar. 21, 1990

[30] Foreign Application Priority Data

Jun. 13, 1989 [JP] Japan ................................ 1-148482

[51] Int. Cl.$^5$ ..................... C08G 63/91; C08L 51/04; C08L 51/06
[52] U.S. Cl. ................................ 524/425; 524/451; 525/68; 525/905
[58] Field of Search .................. 524/425, 451; 555/68, 555/905

[56] References Cited

U.S. PATENT DOCUMENTS

| | | |
|---|---|---|
| 4,480,057 | 10/1984 | Sano . |
| 4,737,536 | 4/1988 | Kawase ........................ 524/451 |
| 4,866,117 | 9/1989 | Egashira ........................ 524/425 |
| 5,075,376 | 12/1991 | Furuta et al. ................... 526/68 |

FOREIGN PATENT DOCUMENTS

| | | |
|---|---|---|
| 0307802 | 3/1982 | European Pat. Off. . |
| 0329423 | 8/1989 | European Pat. Off. . |
| 0352057 | 1/1990 | European Pat. Off. . |
| 4747862 | 4/1972 | Japan . |
| 4812197 | 8/1973 | Japan . |
| 52-142799 | 4/1975 | Japan . |
| 5230991 | 8/1975 | Japan . |
| 5238596 | 8/1977 | Japan . |
| 22344 | 4/1978 | Japan . |
| 495623 | 4/1979 | Japan . |
| 168938 | 4/1980 | Japan . |
| 118739 | 5/1980 | Japan . |
| 113047 | 3/1981 | Japan . |
| 1207349 | 9/1981 | Japan . |

OTHER PUBLICATIONS

JP 63118344, Patent Abstracts of Japan, vol. 12, No. 365.
JP 63125543, Patent Abstracts of Japan, vol. 12, No. 373.

Primary Examiner—Jacob Ziegler
Attorney, Agent, or Firm—Birch, Stewart, Kolasch & Birch

[57] ABSTRACT

Disclosed herein is a thermoplastic resin composition comprising:
(a) a polyphenylene ether or a composition containing a polyphenylene ether,
(b) (i) a modified propylene polymer obtainable by grafting a propylene polymer with a styrene-based monomer alone or in combination with a monomer copolymerizable with a styrene-based monomer, or (ii) a composition composed of said modified propylene polymer and a propylene polymer,
(c) a rubbery substance, and
(d) an inorganic filler having an average particle diameter of 0.05–10 μm.

Not only does this resin composition exhibit good processability but it also provides molded articles having well-balanced physical properties.

13 Claims, No Drawings

THERMOPLASTIC RESIN COMPOSITION

BACKGROUND OF THE INVENTION

1. Field of the Invention

The present invention relates to a new thermoplastic resin composition which can be made into molded articles by injection molding, extrusion molding, or the like.

2. Related Art

Polyphenylene ether resin is generally superior in heat resistance, hot water resistance, dimensional stability, and mechanical and electrical properties. Unfortunately, these advantages are offset by its poor moldability (due to high melt viscosity), poor chemical resistance, and low impact resistance.

One well-known way of improving the molding properties of polyphenylene ether resin by lowering its melt viscosity, while retaining its outstanding properties, is to blend it with polystyrene resin. However, the resulting blend is not improved in chemical resistance.

By contrast, propylene polymer is superior in moldability, toughness, water resistance, and chemical resistance. Moreover, it has a low density and is low in price. Therefore, it has found general use as a variety of molded articles and film and sheet.

Despite these advantages, propylene polymer still has room for improvement in heat resistance, stiffness, impact resistance, coatability, and adhesion properties. These drawbacks hinder the development of its new applications. Improvement in heat resistance and impact resistance is urgently required.

It is expected from the foregoing that polyphenylene ether and propylene polymer will be blended with each other to give a resin composition which has the features of both and improved moldability and impact resistance. Such a resin composition, if feasible, would find use in a variety of new applications.

In practice, however, they are poor in miscibility and their blend merely gives injection molded articles which suffer from phase separation and are too poor in appearance and mechanical properties to be of practical use. Therefore, there is a strong demand in the market for a resin composition which exhibits high impact resistance and outstanding weathering performance while retaining the good heat resistance characteristic of polyphenylene ether.

To meet this demand, the present inventors proposed a thermoplastic resin composition having outstanding heat resistance and mechanical properties which is composed of a polyphenylene ether, a modified propylene polymer which is obtained by grafting a styrene-based monomer alone or in combination with a monomer copolymerizable with a styrene-based monomer, and a rubbery substance. (See Japanese Patent Application No. 287129/1988 and Japanese Patent Laid-open No. 207349/1989.)

This thermoplastic resin composition provides molded articles which exhibit high heat resistance and good mechanical properties but lack sufficient stiffness and dimensional stability. Thus it still has room for improvement in this respect.

With the foregoing in mind, the present inventors carried out a series of researches to develop an effective technology. As the result, they found a new resin compound which is superior in processability and provides molded articles having improved impact resistance, heat resistance, stiffness, dimensional stability, paintability, appearance, and smoothness. This led to the present invention.

SUMMARY OF THE INVENTION

Accordingly, it is an object of the present invention to provide a thermoplastic resin composition which comprises:
(a) a polyphenylene ether or a composition containing a polyphenylene ether,
(b) (i) a modified propylene polymer obtainable by grafting a propylene polymer with a styrene-based monomer alone or in combination with a monomer copolymerizable with a styrene-based monomer, or
(ii) a composition composed of said modified propylene polymer and a propylene polymer.
(c) a rubbery substance, and
(d) an inorganic filler having an average particle diameter of 0.5-10 μm.

It is another object of the present invention to provide a thermoplastic resin composition which comprises:
(a) a polyphenylene ether or a composition containing a polyphenylene ether,
(b) (i) a modified propylene polymer obtainable by grafting a propylene polymer with a styrene-based monomer alone or in combination with a monomer copolymerizable with a styrene-based monomer, or
(ii) a composition composed of said modified propylene polymer and a propylene polymer,
(c) a rubbery substance, and
(d) an inorganic filler having an average particle diameter of 0.05-10 μm,
with the ratio of component (a) to component (b) being 1-90 wt % to 99-10 wt %, the amount of component (c) being 0-60 parts by weight for 100 parts by weight of the total amount of components (a) and (b), and the amount of component (d) being 1-60 parts by weight for 100 parts by weight of the total amount of components (d), (b), and (c).

DETAILED DESCRIPTION OF THE INVENTION

The polyphenylene ether as component (a) in the resin composition of the present invention is obtained by the oxidative polymerization of one or more than one phenol compound represented by the formula [I] below with oxygen or an oxygen-containing gas by the aid of an oxidative coupling catalyst.

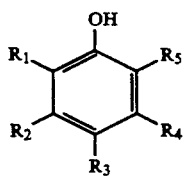

where $R_1$, $R_2$, $R_3$, $R_4$, and $R_5$ each independently denotes a hydrogen atom, a halogen atom, a hydrocarbon group or substituted hydrocarbon group, or a hydrocarbyloxy group or substituted hydrocarbyloxy group; and at least one of $R_1$ to $R_5$ is invariably a hydrogen atom.

Examples of $R_1$, $R_2$, $R_3$, $R_4$, and $R_5$ in the above formula include a hydrogen atom, chlorine atom, bromine atom, fluorine atom, iodine atom, methyl group, ethyl group, n- or isopropyl group, pri-, sec-, or t-butyl group, chloroethyl group, hydroxyethyl group, phenyl-ethyl group, benzyl group, hydroxymethyl group, carboxyethyl group, methoxycarbonylethyl group, cyanoethyl group, phenyl group, chlorophenyl group, methyl phenyl group, dimethylphenyl group, ethylphenyl group, and allyl group.

Examples of the phenol compound represented by the general formula above include phenol, o-, m-, and p-cresols, 2,6-, 2,5-, 2,4-, and 3,5-dimethylphenols, 2-methyl-6-phenylphenol, 2,6-diphenylphenol, 2,6-diethylphenol, 2-methyl-6-ethylphenol, 2,3,5-, 2,3,6-, and 2,4,5-trimethylphenols, 3-methyl-6-t-butylphenol, thymol, and 2-metyl-6-allylphenol.

The polyphenylene ether may also be a copolymer of a phenol compound represented by the general formula above and another phenol compound such as polyhydroxy aromatic compounds including bisphenol A, tetrabromobisphenol A, resorcinol, hydroquinone, and novolak resin.

The preferred examples of the above-mentioned compounds include a homopolymer of 2,6-dimethylphenol (2,6-xylenol) or 2,6-diphenylphenol, and a copolymer composed of 2,6-xylenol (large portion) and 3-methyl-6-t-butylphenol or 2,3,6-trimethylphenol (small portion).

The oxidative coupling catalyst used for the oxidative polymerization of the phenol compound is not specifically limited so long as it is capable of polymerization. As the typical examples may be cited a cuprous chloride-triethylamine or cuprous chloride-pyridine catalyst (composed of a cuprous salt and a tertiary amine), a cupric chloride-pyridine-potassium hydroxide catalyst (composed of a cupric salt, amine, and alkali metal hydroxide), a manganese chloride-ethanolamine or manganese acetate-ethylenediamine catalyst (composed of a manganese salt and a primary amine), a manganese chloride-sodium methylate or manganese chloride-sodium phenolate catalyst (composed of a manganese salt and an alcoholate or phenolate), and a catalyst composed of a cobalt salt and a tertiary amine.

The polymerization for polyphenylene ether may be divided into two categories—high-temperature polymerization (which is carried out above 40° C.) and low-temperature polymerization (which is carried out below 40° C). And it is known that polyphenylene ethers differ in physical properties depending on the polymerization temperature. Any polyphenylene ether produced by either high-temperature polymerization or low-temperature polymerization can be used in the present invention.

The polyphenylene ether in the resin composition of the present invention may also include modified ones obtained by grafting the above-mentioned polymer or copolymer with other polymers. They are illustrated below.

One which is obtained by the oxidative polymerization of a phenol represented by the formula below, which is performed in the presence of an ethylene-propylene-polyene terpolymer.

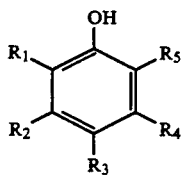
[I]

(wherein all the symbols are defined as above.)

One which is obtained by the oxidative polymerization of a phenol represented by the formula below, which is performed in the presence of polystyrene.

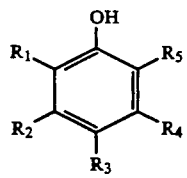
[I]

(wherein all the symbols are defined as above.)

One which is obtained by grafting a polyphenylene ether polymer or copolymer with styrene and/or other polymerizable monomer by the aid of an organic peroxide (See Japanese Patent Publication Nos. 47862/1972, 12197/1973, 5623/1974, 38596/1977, and 30991/1977.)

One which is obtained by reacting the above-mentioned polyphenylene ether polymer or copolymer with a styrene polymer and a radical generator (e.g., peroxide) through mixing in an extruder. (See Japanese Patent Laid-open No. 142799/1977.)

The polyphenylene ether used in the present invention is not specifically limited in reduced viscosity (chloroform solution at 25° C.); however, it may have a reduced viscosity of 0.2–1.0 dl/g, preferably 0.25–0.6 dl/g, according to its intended use.

Furthermore, the polyphenylene ether as component (a) in the resin composition of the present invention embraces modified polyphenylene ethers which are described in detail in the following. Their proper choice depends on the market demand etc.

Typical examples of the modified polyphenylene ethers include those which are modified with a polyfunctional compound (E) having in the molecule one or more functional groups such as carboxyl group, acid anhydride group, acid amide group, imide group, carboxylate group, epoxy group, amino group, and hydroxyl group, in the presence or absence of a radical initiator. They also include those which are modified with an epoxy compound (J) or an organosilane compound (K) explained later.

The polyfunctional compound (E), which is used as a modifier of polyphenylene ether according to the present invention, is one which has in the molecule one or more functional groups such as carboxyl group, acid anhydride group, acid amide group, imide group, carboxylate group, epoxy group, amino group, and hydroxyl group. Preferably, it is a compound (F) which has in the molecule both (i) a carbon-carbon double bond or triple bond and (ii) one or more of carboxyl group, acid anhydride group, acid amide group, imide group, carboxylate group, epoxy group, amino group, and hydroxyl group.

Examples of the compound (F) include the following.

Maleic anhydride, maleic acid, fumaric acid, maleimide, and maleic hydrazide.

Reaction products of maleic anhydride and a diamine, which are represented by the following structural formulas.

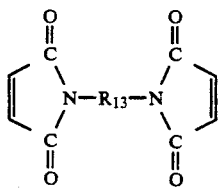

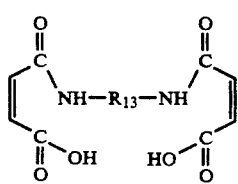

(where $R_{13}$ denotes an aliphatic or aromatic group.)

Methylnadic anhydride, dichloromaleic anhydride, and maleamide.

Natural fats and oils such as soybean oil, tung oil, castor oil, linseed oil, hampseed oil, cotton seed oil, sesame oil, rapeseed oil, peanut oil, camellia oil, olive oil, coconut oil, and sardine oil.

Epoxidized natural fats and oils such as epoxidized soybean oil.

Unsaturated carboxylic acids such as acrylic acid, butenoic acid, crotonic acid, vinylacetic acid, methacrylic acid, pentenoic acid, angelic acid, tiglic acid, 2-pentenoic acid, 3-pentenoic acid, α-ethyl-acrylic acid, β-methylcrotonic acid, 4-pentenoic acid, -hexenoic acid, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, icosanoic acid, docosenoic acid, erucic acid, tetracosenoic acid, 2,4-pentadienoic acid, 2,4-hexadienoic acid, diallyl acid, geranium acid, 2,4-decadienoic acid, 2,4-dodecadienoic acid, 9,12-hexadecadienoic acid, 9,12-octadecadienoic acid, hexadecatrienoic acid, linoleic acid, linolenic acid, octatrienoic acid, eicosadienoic acid, eicosatrienoic acid, eicosatetraenoic acid, ricinolic acid, eleostearic acid, oleic acid, eicosapentaenoic acid, erucic acid, docosadienoic acid, docosadienoic acid, docosatrienoic acid, docosatetraenoic acid, docosapentaenoic acid, tetracosenoic acid, hexacosenoic acid, hexacodienoic acid, and octacosenoic acid.

Esters, acid amides, and anhydrides of the above-mentioned unsaturated carboxylic acids.

Unsaturated alcohols such as allyl alcohol, crotyl alcohol, methylvinylcarbinol, allylcarbinol, methylpropenylcarbinol, 4-penten-1-ol, 10-undecen-1-ol, propargyl alcohol, 1,4-pentadien-3-ol, 1,4-hexadien-3-ol, 3,5-hexadien-2-ol, 2,4-hexadien-1-ol, alcohols represented by the general formulas $C_nH_{2n-5}OH$, $C_nH_{2n-7}OH$, and $C_nH_{2n-7}OH$ (where n is a positive integer), 3-butene-1,2-diol, 2,5-dimethyl-3-hexene-2,5-diol, 1,5-hexadiene-3,4-diol, and 2,6-octadiene-4,5-diol.

Unsaturated amines formed by substituting an $-NH_2$ group for the $-OH$ group in the above-mentioned unsaturated alcohols.

Compounds formed by adding maleic anhydride or phenol to or introducing an amino group, carboxylic group, hydroxyl group, or epoxy group into an oligomer (having an average molecular weight of 500-10000) or a polymer (having an average molecular weight higher than 10,000) of butadiene or isoprene.

Preferred examples of the polyfunctional compound (E) include aliphatic carboxylic acids, acid esters, and acid amides represented by the general formula [V] below and compounds (G) selected from their derivatives.

$$(R^IO)_mR^{14}(COOR^{II})_n(CONR^{III}R^{IV})_s \qquad (V)$$

(where $R^{14}$ denotes a straight-chain or branched-chain aliphatic saturated hydrocarbon group having 2-20 carbon atoms; $R^I$ denotes hydrogen or a group selected from the group consisting of $C_{1-10}$ alkyl groups, aryl groups, acyl groups, and carbonyldihydroxy groups; $R^{II}$ denotes hydrogen or a group selected from the group consisting of $C_{1-20}$ alkyl groups and aryl groups; $R^{III}$ and $R^{IV}$ each independently denotes hydrogen or a group selected from the group consisting of $C_{1-10}$ alkyl groups and aryl groups; m and n are integers including 0; and $m+n+s \geq 2$.)

Examples of the compound (G) include hydroxyacetic acid, lactic acid, α-hydroxy-n-butyric acid, α-hydroxyisobutyric acid, α-hydroxy-n-valeric acid, α-hydroxyisovaleric acid, 2-hydroxy-2-methylbutanoic acid, α-hydroxy-n-caproic acid, α-hydroxyisocaproic acid, 2-ethyl-2-hydroxybutanoic acid, 2-hydroxy-3,3-dimethylbutanoic acid, 2-hydroxy-2-methylpentanoic acid, 2-hydroxy-5-methylhexanoic acid, 2-hydroxy-2,4-dimethylpentanoic acid, 3-hydroxypropionic acid, β-hydroxybutyric acid, β-hydroxyisobutyric acid, β-hydroxy-n-valeric acid, β-hydroxyisovaleric acid, 2-hydroxymethylbutanoic acid, hydroxypivalic acid, 3-hydroxy-2-methylpetanoic acid, 1,1-hydroxytetradecanoic acid, jalapinolic acid, 1,4-hydroxyhexadecanoic acid, sabinic acid, juniperic acid, hydroxymalonic acid, methyltartronic acid, ethyltartronic acid, n-propyltartronic acid, isopropyltartronic acid, hydroxymethylmalonic acid, hydroxyisopropylmalonic acid, ethyl-hydroxymethylmalonic acid, malic acid, α-methylmalic acid, α-hydroxy-α'-methylsuccinic acid, α-hydroxy-α',α'-dimethylsuccinic acid, α-hydroxy-α,α'-diethylsuccinic acid, α-hydroxy-α'-ethylsuccinic acid, α-hydroxy-α'-methyl-α-ethylsuccinic acid, trimethylmalic acid, α-hydroxyglutaric acid, β-hydroxyglutaric acid, β-hydroxy-β-methylglutaric acid, α-hydroxyadipic acid, citric acid, isocitric acid, norcaperatic acid, agaricic acid, glyceric acid, α,β-dihydroxybutyric acid, α,β-dihydroxyisobutyric acid, β,β'-dihydroxyisobutyric acid, β,γ-dihydroxybutyric acid, α,γ-dihydroxy-β,β-dimethylbutyric acid, α,β-dihydroxy-α-isopropylbutyric acid, ipurolic acid, ustic acid-A, 9,10-dihydroxyoctadecanoic acid, tartaric acid (optically active or racemic), mesotartaric acid, methyltartaric acid, α,β-dihydroxyglutaric acid, α,γ-dihydroxy-β-methylglutaric acid, α,γ-dihydroxy-β-methyl-β-ethylglutaric acid, α,γ-dihydroxy-α,γ-dimethylglutaric acid, α,δ-dihydroxyadipic acid, γ,δ-dihydroxyadipic acid, 6,7-dihydroxydodecane diacid, 7,8-dihydroxyhexadecane diacid, furoinic acid, trihydroxybutyric acid, trihydroxyisobutyric acid, trihydroxyglutaric acid, succinic acid, glutaric acid, adipic acid, α-methylglutaric acid, and dodecadiacid.

The derivatives of the compound represented by the general formula (V) above include lactones, acid anhydrides, alkali metal salts, alkaline earth metal salts, and amine salts. Their typical examples are listed below.

β-Propiolactone, glycollide, lactide, β-methylpropiolactone, β,β-dimethylpropiolactone, β-n-propylpropiolactone, β-isopropylpropiolactone, β-methyl-β-ethylpropiolactone, γ-butyrolactone, γ-valerolactone, δ-valerolactone, δ-caprolactone, ε-caprolactone, 1,5-hydroxypentadecanoic acid lactone, γ-butyrolactone-α-carboxylic acid, paraconic acid, α-methylparaconic acid, β-methylparaconic acid, α-ethylparaconic acid, α-isopropylparaconic acid, γ-methylparaconic acid, γ-ethylparaconic acid, α,γ-dimethylparaconic acid, β,γ-dimethylparaconic acid, α,α,β-trimethylparaconic acid, γ,γ-dimethylparaconic acid, nephrosteraic acid, γ-valerolactone-γ-carboxylic acid, γ-isopropyl-γ-butyrolactone-γ-carboxylic acid, α,α-dimethyl-γ-carboxylic acid, α,α-dimethyl-γ-butyrolactone-γ-carboxylic acid, β-methyl-γ-valerolactone-γ-carboxylic acid, α,β-dimethyl-γ-valerolactone-γ-carboxylic acid, α,β-dimethyl-γ-butyro-lactone-γ-carboxylic acid, α-(γ-hydroxycarbonylpropyl)-γ-butyrolactone, β-hydroxyadipic acid-γ-lactone, α,δ-diemthyl-β-dimethylhdyroxyadipic acid-γ-lactone, β-hydroxy-β-methyladipic acid-γ-lactone, α-(δ'-carboxy-n-butyl)-γ-butyrolactone, α-methylisocitric acid lactone, cinchonic acid, α-hydroxy-γ-butyrolactone, β-hydroxy-γ-butyrolactone, δ-hydroxy-γ-valerolactone, pantolactone, mevalonic acid, malic anhydride, tartaric anhydride, hydroxyglutaric anhydride, α,β,γ-trihydroxyvaleic acid lactone, α-hydroxy-α-hydroxymethyl-γ-butyrolactone, succinic anhydride, and glutaric anhydride. They may be used alone or in combination with one another.

Preferable among the above-mentioned compounds are tartaric acid, malic acid, citric acid, and derivatives thereof. They also include commercial products in the anhydrous or hydrated form.

Useful examples of the derivatives include acetyl citrate, monostearyl and/or distearyl citrate, N,N'-diethylcitramide, N,N'-dipropylcitramide, N-phenylcitramide, N-dodecylcitramide, N,N'-didodecylcitramide, calcium malate, calcium citrate, potassium malate, and potassium citrate.

Preferred examples of the polyfunctional compound (E) are those compounds (H) which have in the molecule (i) an acid halide group (preferably an acid chloride group) and (ii) at least one carboxylic acid group, carboxylic acid anhydride group, acid ester group, or acid amide group (preferably carboxylic acid group or carboxylic acid anhydride group).

Examples of the compounds (H) include anhydrotrimellitic acid chloride, chloroformylsuccinic acid anhydride, chloroformylsuccinic acid, chloroformylglutaric acid anhydride, chloroformylglutaric acid, chloroacetylsuccinic acid anhydride, chloroacetyl succinic acid, trimetllic acid chloride, and chloroacetylglutaric acid. Preferable among them is anhydrotrimellitic acid chloride.

The above-mentioned compounds (F), (G), and (H) are described in detail in U.S. Pat. Nos. 4315086 and 642358.

According to the present invention, polyphenylene ether may be modified with not only the above-mentioned compounds but also epoxy compounds (J) and organosilane compounds (K) explained below.

The epoxy compound (J) as a modifier for polyphenylene ether is an epoxy compound having an oxirane group in the molecule and/or an epoxy compound of condensation polymer composed of a dihydric phenol and epichlorohydrin.

Examples of the epoxy compound (J) include epoxidized olefins or epoxidized cycloalkenes such as ethylene oxide, propylene oxide, and cyclohexene oxide.

Other examples of the epoxy compound (J) are condensation products composed of a dihydric phenol and epichlorohydrin in a varied ratio. They include condensation products of bisphenol A and epichlorohydrin (which are commercially available from Sumitomo Chemical Co., Ltd. under a trade name of ELA-115, ELA-127, ELA-128, ELA-134, ESA-011, ESA-014, and ESA-019 and from Union Carbide Corp. under a generic name of phenoxy resin); condensation products of resorcinol and epichlorohydrin; condensation products of hydroquinone and epichlorohydrin; condensation products of tetrabormobisphenol A and epichlorohydrin; and glycidyl etherified products of phenol novolak or cresol novolak (which are commercially available from Sumitomo Chemical Co., Ltd. under a trade name of Sumiepoxy ESCN-220).

Additional examples of the epoxy compound (J) are condensation products of a polyhydric alcohol and epichlorohydrin. Examples of the polyhydric alcohol include ethylene glycol, propylene glycol, butylene glycol, polyethylene glycol, polypropylene glycol, glycerin, trimethylolethane, trimethylolpropane, and pentaerythritol.

Further additional examples of the epoxy compound (J) are glycidyl etherified products of a monohydric phenol or monohydric alcohol, such as phenyl glycidyl ether, butyl glycidyl ether, and cresyl glycidyl ether.

Further additional examples of the epoxy compound (J) are glycidylated products of an amine compound, such as diglycidylated aniline (which is commercially available from Sumitomo Chemical Co., Ltd. under a trade name of Sumiepoxy ELN-125).

Further additional examples of the epoxy compound (J) are polymers of an epoxy-containing unsaturated compound (such as glycidyl acrylate, glycidyl methacrylate, and allylglycidyl ether), and copolymers of an epoxy-containing unsaturated compound and one or more kinds of other monomer (such as ethylene, propylene, butene, styrene, α-methylstyrene, 4-methyl-pentene, chlorostyrene, bromostyrene, acrylic acid, acrylic ester, acrylonitrile, vinyl chloride, methacrylic acid, methacrylic ester, maleic anhydride, and vinyl acetate). Preferable among them are styrene-glycidyl (meth)acrylate copolymer and ethylene-glycidyl (meth)acrylate copolymer.

The organosilane compound (K) as a modifier for polyphenylene ether is an organosilane compound having in the molecule (i) at least one silicon atom attached to a carbon atom through an oxygen atom, (ii) a carbon-carbon double bond or triple bond, and (iii) at least one functional selected from amino, mercapto group, carboxylic acid, acid anhydride, acid amide, carboxylic ester, imide, and hydroxyl.

The above-mentioned organosilane compound (K) usually has one or more alkoxy groups or acetoxy groups attached directly to the silicon atom through the C—O—Si linkage. These alkoxy groups or acetoxy groups usually have less than 15 carbon atoms.

The organosilane compound may have two or more silicon atoms, in which case the silicon atoms are connected through an oxygen atom (as in the case of cyclosiloxane), an Si-Si linkage, or a difunctional organic group (such as methylene group and phenylene group).

Preferred examples of the organosilane compound (K) include γ-aminopropyltriethoxysilane, 2-(3- cycohexenyl)ethyltrimethoxysilane, 1,3-divinyltetraethoxysilane, vinyl-tris(2-methoyethoxy)silane, 5-bicycloheptenyltriethoxysilane, and γ-mercaptopropyltirmethoxysilane.

According to the present invention, the compounds (E), (F), (G), (H), (J), and (K) are used in varied amounts depending on the intended use of the resin composition. Usually they are used in an amount of less than 200 parts by weight, preferably less than 80 parts by weight, more preferably less than 20 parts by weight, and most preferably 0.01–10 parts by weight for 100 parts by weight of polyphenylene ether.

The compounds (E), (F), (G), (H), (J), and (K) may be used in combination with a radical initiator for the modification of polyphenylene ether. The radical initiator is a known organic peroxide or diazo compound which include the following.

2,2'-azobisisobutyronitrile,
2,2'-azobis(2,4,4-trimethylvaleronitrile),
methyl ethyl ketone peroxide,
cyclohexanone peroxide,
3,3,5-trimethylcyclohexanone peroxide,
2,2-bis(t-butylperoxy)butane,
t-butyl hydroperoxide,
cumene hydroperoxide,
diisopropylbenzene hydroperoxide,
2,5-dimethylhexane-2,5-dihydroperoxide,
di-t-butyl peroxide,
1,3-bis(t-butylperoxyisopropyl)benzene,
2,5-dimethyl-2,5-di(t-butyl peroxy)hexane,
2,5-dimethyl-2,5-di(t-butyl peroxy)hexyne-3,
lauroyl peroxide,
3,3,5-trimethylhexanoyl peroxide,
benzoyl peroxide,
t-butyl peracetate,
t-butyl peroxyisobutyrate,
t-butyl peroxypivalate,
t-butyl peroxy-2-ethylhexanoate,
t-butyl peroxy-3,5,5-trimethylhexanoate,
t-butyl peroxylaurate,
t-butyl peroxybenzoate,
di-t-butyl peroxyisophthalate,
2,5-dimethyl-2,5-di(benzoyl peroxy)hexane,
t-butyl peroxymaleic acid,
t-butyl peroxyisopropyl carbonate, and
polystyrene peroxide.

Preferred examples include benzoyl peroxide, dicumyl peroxide, di-tert-butyl peroxide, tert-butylcumyl peroxide, tert-butyl hydroperoxide, cumene hydroperoxide, and azobisisobutyronitrile.

The radical initiator should be used in an amount of 0.01–10 parts by weight, preferably 0.1–5 parts by weight, for 100 parts by weight of polyphenylene ether. The modified polyphenylene ether produced as mentioned above may be one which is formed by the chemical reaction of a polyphenylene ether with the above-mentioned modifiers or one in which a polyphenylene ether is connected to the modifiers through physical actions (such as adsorption).

According to the present invention, the modification of a polyphenylene ether may also be accomplished by grafting a polyphenylene ether with an unsaturated monomer (excluding the above-mentioned polyfunctional compound (F) having an unsaturated group) alone or in combination with the polyfunctional compound (F), in the presence of a radical initiator.

This unsaturated monomer is a vinyl compound and/or vinylidene compound (L), whose examples are shown below.

Aromatic vinyl or vinylidene compounds such as α-methylstyrene, o-, m-, and p-methylstyrenes, chlorostyrene, bromostyrene, divinylbenzene, hydroxystyrene, and aminostyrene.

Olefins such as ethylene.

(Meth)acrylic esters such as methyl (meth)acrylate, ethyl (meth)acrylate, propyl (meth)acrylate, and octyl (meth)acrylate.

Cyanovinyl compounds such as acrylonitrile and methacrylonitrile.

Vinyl esters such as vinyl acetate.

Vinyl ethers such as methyl vinyl ether, ethyl vinyl ether, and butyl vinyl ether.

Unsaturated halogen compounds such as vinyl chloride and vinylidene chloride.

These unsaturated monomers may be used alone or in combination with one another.

Preferred examples of the unsaturated monomers for grafting include styrene and combinations of styrene-glycidyl methacrylate, styrene-glycidyl acrylate, styrene-maleic anhydride, styrene-acrylic acid, and styrene-methacrylic acid. According to the present invention, the compound (L) should be used in an amount of less than 200 parts by weight, preferably 0.5–100 parts by weight, and more preferably 1–50 parts by weight, for 100 parts by weight of polyphenylene ether.

The modified polyphenylene ether may be produced by any one of the following known method, which is not specifically limited.

(1) Method by which the polyphenylene ether and the above-mentioned compounds (both in the form of pellets, powder, or chips) are uniformly mixed in a high-speed mixer or the like and the resulting mixture is melted and kneaded.

(2) Method by which the polyphenylene ether is dissolved or swollen in a solvent and then the above-mentioned compounds are added to the thus formed solution, with stirring and heating to effect dissolution or swelling.

(3) Method by which the polyphenylene ether is incorporated with the above-mentioned compounds and the resulting mixture is dispersed into water with stirring and heating. (For stable dispersion, it is desirable to use a dispersing agent such as polyvinyl alcohol, sodium dodecylbenzenesulfonate, and calcium phosphate. In some cases, it may also be desirable to add a solvent which dissolves or swells the polyphenylene ether.)

No restrictions are imposed on the temperature and time of melting and kneading in method (1). Usually the temperature ranges from 150° to 350° C. depending on the type and quantity of the compounds used.

The melting and kneading may be accomplished either batchwise or continuously by means of an apparatus capable of handling a viscous melt. Examples of the apparatus include a single-screw extruder, multi-screw extruder, Banbury mixer, roll, kneader, etc.

No restrictions are imposed on the solvent used in methods (2) and (3); any solvent may be used so long as it dissolves or swells polyphenylene ether. Examples of the solvent include chloroform, methylene chloride, benzene, xylene, chlorobenzene, cyclohexane, styrene, toluene, and o-chlorophenol. A mixed solvent may also be sued so long as it is capable of dissolution or swelling.

The mixing temperature and time are not specifically limited. The mixing temperature is usually 20°-250° C., and the mixing time is usually 1 minute to 10 hours.

In the case where the resin composition of the present invention is based on a modified polyphenylene ether, it is desirable to prepare the modified polyphenylene ether previously and then mix it with other components to produce the resin composition. Alternatively, it is also possible to mix the polyphenylene ether, modifiers (the compounds mentioned above), and other components all at once to produce the resin composition.

According to the present invention, a polyphenylene ether and a modified polyphenylene ether as the component (a) may be used alone or in combination with on another.

According to the present invention, the component (a) may also be a composition containing a polyphenylene ether This composition is one which is composed of a polyphenylene ether and/or a modified polyphenylene ether and at least one kind of other polymeric compounds.

Examples of the other polymeric compounds include the following.

Polyolefins such as polymethylpentene.

Homopolymers and copolymers of vinyl compounds such as polyvinyl chloride, polymethyl methacrylate, polyvinyl acetate, polyvinylpyridine, polyvinyl carbazole, polyacrylamide, polyacrylonitrile, ethylene-vinyl acetate copolymer, and alkenyl aromatic resin.

Polycarbonate, polysulfone, polyethylene terephthalate, polybutyrene terephthalate, polyarylene ester (e.g., "U-Polymer" of Unitica Co., Ltd.), and polyphenylene sulfide.

Polyamides such as nylon 6, nylon 66, and nylon 12.

Condensation polymers such as polyacetate.

Thermosetting resins such as silicone resin, fluorocarbon resin, polyimide, polyamideimide, phenolic resin, alkyd resin, unsaturated polyester resin, epoxy resin, and diallyl phthalate resin.

The thermoplastic resin composition of the present invention contains, in addition to the above-mentioned component (a), the component (b), which is (i) a modified propylene polymer obtainable by grafting a propylene polymer with a styrene-based monomer alone or in combination with a monomer copolymerizable with a styrene-based monomer, or (ii) a composition composed of said modified propylene polymer and a propylene polymer.

The modified propylene polymer is one which is formed by grafting 100 parts by weight of propylene polymer with 0.2-150 parts by weight, preferably 2-90 parts by weight, more preferably 3-70 parts by weight, of a styrene-based monomer or a mixture of a styrene-based monomer and a monomer copolymerizable with the styrene-based monomer. The grafting monomer less than 0.2 part by weight is not effective in improving the polyphenylene ether. The grafting monomer in excess of 150 parts by weight has an adverse effect on chemical resistance.

The propylene polymer (inclusive of the raw one to be modified) denotes a propylene homopolymer or propylene copolymer. The latter includes random or block copolymers consisting of propylene and an α-olefin having 2-18 carbon atoms.

Examples of the propylene copolymers include ethylene-propylene copolymer, propylene-1-butene copolymer, propylene-1-hexene copolymer, propylene-4-methyl-1-pentene copolymer, and propylene-1-octene copolymer.

The propylene polymer may be incorporated with an ethylene-α-olefin copolymer and/or a styrene-modified one, according to need. The former should preferably be one which has a density of 0.82-0.92 g/cm$^3$.

The propylene polymer may be a highly crystalline one, if necessary. The highly crystalline propylene polymer is characterized in that the unit of propylene homopolymer, which is the first segment formed in the first step of polymerization for a propylene homopolymer or copolymer, contains boiling heptane insolubles whose isotactic pentad ratio is higher than 0.970. This polymer may also be characterized in that the unit of propylene homopolymer contains boiling heptane insolubles whose isotactic pentad ratio is higher than 0.970 and also contains less than 5.0 wt % of boiling heptane solubles and less than 2.0 wt % of xylene solubles (20° C).

The highly crystalline propylene polymer mentioned above can be produced by the processes disclosed in Japanese Patent Laid-open Nos. 28405/1985, 228504/1985, 218606/1986, and 287917/1986.

In the case where the thermoplastic resin composition is intended for use in application areas where high stiffness is required, the highly crystalline propylene polymer should preferably be incorporated with nucleating agent. Examples of the nucleating agent include an aluminum salt or sodium salt of an aromatic carboxylic acid (as disclosed in Japanese Patent Laid-open No. 80829/1983), an aromatic carboxylic acid, a metal salt of an aromatic phosphoric acid, and a sorbitol derivative (as disclosed Japanese Patent Publication No. 12460/1980 and Japanese Patent Laid-open No. 129036/1983). The nucleating agent provides nuclei for crystal growth, giving rise to high crystallinity.

It is known that the same effect as that of the above-mentioned nucleating agent may be produced by a polymer of a vinylcycloalkane having 6 or more carbon atoms (as disclosed in Japanese Patent Laid-open No. 1738/1987). In other words, the propylene polymer composition will exhibit a high crystallinity if it contains 0.05 to 10000 ppm (by weight) of vinylcycloalkane units.

In addition, it is possible to obtain a highly stiff propylene polymer if the above-mentioned highly crystalline propylene polymer is blended with the vinylcycloalkane polymer.

The propylene polymers (homopolymers and copolymers) may be used alone or in combination with one another.

The component (b) of the resin composition of the present invention is formed by grafting the above-mentioned propylene polymer with a styrene-based monomer, which is represented by the formula [II] below.

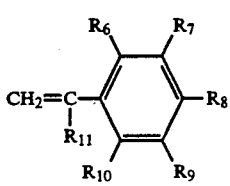

where $R_6$, $R_7$, $R_8$, $R_9$, and $R_{10}$ each independently represents a hydrogen atom, halogen atom, hydrocarbon group or substituted hydrocarbon group, and hydrocarbyloxy group or substituted hydrocarbyloxy group; and $R_{11}$ represents a hydrogen atom or a lower alkyl group having 1-4 carbon atoms.

Examples of $R_6$, $R_7$, $R_8$, $R_9$, and $R_{10}$ in the formula [II] above include hydrogen atoms, halogen atoms (such as chlorine, bromine, and iodine), hydrocarbon groups (such as methyl, ethyl, propyl, vinyl, allyl, benzyl, and methylbenzyl), substituted hydrocarbon groups (such as chloromethyl and bromomethyl), and hydrocarbyloxy groups or substituted hydrocarbyloxy groups (such as methoxy, ethoxy, phenoxy, and monochloromethoxy). Examples of $R_{11}$ include hydrogen atoms and lower alkyl groups (such as methyl and ethyl).

Examples of the styrene-based monomer include styrene, 2,4-dichlorostyrene, p-methoxystyrene, p-methylstyrene, p-phenylstyrene, p-divinylbenzene, p-(chloromethoxy)-styrene, α-methylstyrene, o-methyl-α-methylstyrene, m-methyl-α-methylstyrene, p-methyl-α-methylstyrene, and p-methoxy-α-methylstyrene. They may be used alone or in combination with one another. Styrene is preferable among them.

The modified propylene polymer as the component (b) of the resin composition of the present invention may also be produced by grafting with a mixture of the above-mentioned styrene-based monomer and a monomer copolymerizable therewith. The modified propylene polymer thus formed contributes to the superior mechanical properties of the resin composition.

Examples of the monomer copolymerizable with the styrene-based monomer include acrylonitrile, methacrylonitrile, fumaric acid, maleic acid, vinyl ketone, maleic anhydride, acrylic acid, methacrylic acid, vinylidene chloride, maleic ester, methyl methacrylate, ethyl methacrylate, propyl methacrylate, butyl methacrylate, methyl acrylate, ethyl acrylate, propyl acrylate, butyl acrylate, vinyl chloride, vinyl acetate, divinyl benzene, ethylene oxide, isobutene, alkyl vinyl ether, anethole, indene, coumarone, benzofuran, 1,2-dihycronaphthalene, acenaphthylene, isoprene, chloroprene, trioxane, 1,3-dioxolane, propylene oxide, β-propiolactone, vinyl biphenyl, 1,1-diphenylethylene, 1-vinylnaphthalene, 2-vinylnaphthalene, 2-vinylpyridine, 4-vinylpyridine, 2,3-dimethylbutadiene, ethylene, propylene, allyltrimethylsilane, 3-butenyltrimethylsilane, vinyl carbazole, N,N-diphenylacrylamide, and fumarnitrile. Derivatives of these monomers can also be used. They may be used alone or in combination with one another. Preferable among them are maleic anhydride, methyl methacrylate, and acrylonitrile.

The mixing ratio of the styrene-based monomer and the monomer copolymerizable with the styrene-based monomer may be varied as desired according to the intended use of the resin composition. It is desirable that the styrene-based monomer accounts for 1-100 wt %.

No restrictions are imposed on the process of producing the modified propylene polymer by the graft polymerization with a styrene-based monomer or a monomer copolymerizable with a styrene-based monomer. The graft polymerization may be accomplished by well-known suspension polymerization, emulsion polymerization, solution polymerization, or bulk polymerization (in a polymerization vessel or by an extruder).

One process, for example, involves the steps of forming a styrene-acrylonitrile copolymer by anionic polymerization and melt-mixing the copolymer with a propylene polymer and a peroxide (mentioned below), thereby forming a modified propylene copolymer. Another process consists of copolymerizing a propylene polymer with a styrene-based monomer and glycidyl methacrylate.

The peroxide used for the production of the modified propylene polymer is not specifically limited. A proper one should be selected from among the organic peroxides illustrated above for the preparation of modified polyphenylene ether.

As mentioned above, the component (b) in the thermoplastic resin composition of the present invention is (i) a modified propylene polymer obtainable by grafting a propylene polymer with a styrene-based monomer alone or in combination with a monomer copolymerizable with a styrene-based monomer, or (ii) a composition composed of said modified propylene polymer and a propylene polymer. The component (b) may be incorporated with a variety of additives, according to need. The additives include an antioxidant, heat stabilizer, light stabilizer, antistatic agent, inorganic and organic colorant, corrosion inhibitor, crosslinking agent, blowing agent, slip agent, plasticizer, fluorescent agent, surface smoothing agent, and surface brightener.

The thermoplastic resin composition of the present invention may contain a rubbery substance as the component (c), which is intended for the improvement of impact resistance. By "rubbery substance" is meant any natural and synthetic polymeric material which is elastic at room temperature.

Examples of the rubbery substance include natural rubber, butadiene polymer, butadiene-styrene copolymer (including random copolymer, block copolymer, and graft copolymer) and hydrogenated products thereof, isoprene polymer, chlorobutadiene polymer, butadiene-acrylonitrile copolymer, isobutylene polymer, isobutylene-butadiene copolymer, isobutylene-isoprene copolymer, acrylic ester copolymer, ethylene-propylene copolymer, ethylene-butene copolymer, ethylene-propylene-styrene copolymer, styrene-isoprene copolymer and hydrogenated products thereof, styrene-butylene copolymer, styrene-ethylene-propylene copolymer, perfluororubber, fluororubber, chloroprene rubber, butyl rubber, silicone rubber, ethylene-propylene-nonconjugated diene copolymer, thiokol rubber, polysulfide rubber, polyurethane rubber, polyether rubber (such as polypropylene oxide), epichlorohydrin rubber, polyester elastomer, polyamide elastomer, and epoxy group-containing copolymer.

By "epoxy group-containing copolymer" is meant a copolymer composed of an unsaturated epoxy compound and an ethylenically unsaturated compound.

The epoxy group-containing copolymer is not specifically limited in its composition; but it should preferably contain an unsaturated epoxy compound in an amount of 0.1-50 wt %, preferably 1-30 wt %.

The unsaturated epoxy compound is a compound which has in the molecule an epoxy group and an unsaturated group copolymerizable with an ethylenically unsaturated compound.

Examples of the unsaturated epoxy compound include unsaturated glycidyl esters and unsaturated glycidyl ethers represented by the formulas [III] and [IV] below, respectively.

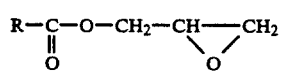

[III]

(where R is a $C_{2-18}$ hydrocarbon group having an ethylenically unsaturated bond.)

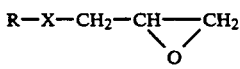

(where R is a C$_{2-18}$ hydrocarbon group having an ethylenically unsaturated bond, and X is a group represented by —CH$_2$—O— or

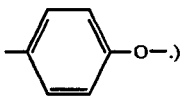
)

Examples of the compound represented by the formulas above include glycidyl acrylate, glycidyl methacrylate, glycidyl itaconate ester, allyl glycidyl ether, 2-methylallyl glycidyl ether, and styrene p-glycidyl ether.

Examples of the ethylenically unsaturated compound include olefins, vinyl esters of saturated carboxylic acids having 2-6 carbon atoms, esters of acrylic acid or methacrylic acid with saturated alcohols having 1-8 carbon atoms, maleic esters, methacrylic esters, fumaric esters, vinyl halides, styrenes, nitriles, vinyl ethers, and acrylamides.

Specific examples include ethylene, propylene, butene-1, vinyl acetate, methyl acrylate, ethyl acrylate, methyl methacrylate, dimethyl maleate, diethyl fumarate, vinyl chloride, vinylidene chloride, styrene, acrylonitrile, isobutyl vinyl ether, and acrylamide. Preferable among them is ethylene.

The epoxy group-containing copolymer as the rubbery substance decreases in glass transition point when it is copolymerized with ethylene and vinyl acetate and/or methyl acrylate. In this way it is possible to improve further the thermoplastic resin composition of the present invention in impact resistance at low temperatures.

The rubbery substance may be produced by any process (e.g., emulsion polymerization and solution polymerization) using any catalyst (e.g., peroxide, trialkyl aluminum, lithium halide, and nickel-based catalyst).

Moreover, the rubbery substance may have varied degrees of crosslinking, varied ratios of microstructure (e.g., cis-structure, trans-structure, and vinyl group), and varied average rubber particle diameters.

In addition, the above-mentioned copolymer as the rubbery substance may be used in the form of random copolymer, block copolymer, or graft copolymer. These copolymers may also be modified with one or more modifiers such as styrene, maleic anhydride, glycidyl methacrylate, glycidyl acrylate, and carboxylic acid-containing compound.

The above-mentioned rubbery substances (including modified products thereof) may be used alone or in combination with one another.

One of the rubbery substances that are used in he present invention is ethylene-α-olefin copolymer rubber or a modified product thereof, such as ethylene-propylene copolymer.

Examples of the ethylene-α-olefin copolymer rubbers include copolymers of ethylene with an α-olefin (other than ethylene) such as propylene, 1-butene, 1-pentene, 1-hexene, 4-methyl-1-pentene, and 1-octene, and terpolymers such as ethylene-propylene-1-butene copolymer.

The ethylene-α-olefin copolymer rubber should contain ethylene in an amount of 15-85 wt %, preferably 40-80 wt %. With an ethylene content higher than 85 wt %, it cannot be readily processed under normal molding conditions due to high crystallinity. With an ethylene content lower than 15 wt %, it will have a high glass transition point (Tg), which adversely affects the elastic properties. The glass transition point should preferably be lower than $-10°$ C.

Another preferred example of the copolymer rubber is ethylene-α-olefin-nonconjugated diene copolymer rubber. It should preferably contain less than 20 wt % of nonconjugated diene; otherwise, it undergoes gelation during kneading, which aggravates its flow properties. Preferred examples of the nonconjugated diene include ethylidene norbornene, dicyclopentadiene, and 1,4-hexadiene.

The copolymer rubbers should have a number-average molecular weight in the range of 10,000 to 100,000 so that it can be easily kneaded in an extruder. With an excessively small molecular weight, it is hard to handle when it is fed to an extruder. With an excessively high molecular weight, it is difficult to process due to low fluidity. In addition, the copolymer rubber should preferably have a Mooney viscosity (ML$_{1+4}$, 121° C.) of 5 to 120.

No restrictions are imposed on molecular weight distribution; however, it should preferably be such that the Q value (weight-average molecular weight divided by number-average molecular weight) is in the range of 1 to 30, more desirably 2 to 20.

The modified ethylene-α-olefin copolymer rubber, which is a preferred rubbery substance as the component (c) in the present invention, includes an unsaturated dicarboxylic acid-modified ethylene-α-olefin copolymer rubber which is prepared by grafting the above-mentioned ethylene-α-olefin copolymer rubber with an unsaturated dicarboxylic acid, such as maleic anhydride, maleic acid, fumaric anhydride, and citraconic anhydride.

The modified ethylene-α-olefin copolymer rubber can be produced by any known process. An example is explained below with reference to the production of maleic anhydride-modified ethylene-α-olefin copolymer rubber. First, ethylene-α-olefin copolymer rubber is reacted with maleic anhydride in the presence of a radical initiator in a hydrocarbon solvent at 60°-150° C. for several minutes to several hours, to give a solution containing modified rubber. If necessary, the solution may be incorporated with an alcohol or amine to convert the maleic anhydride into a half ester or half amide, respectively. The resulting solution is poured into a large amount of methanol or acetone to recover the desired modified rubber.

Alternatively, the modified copolymer rubber may also be obtained by mixing ethylene-α-olefin copolymer rubber together with maleic anhydride and a radical initiator in an extruder. To be more specific, 100 parts by weight of rubber is mixed with 0.5-15 parts by weight of maleic anhydride and 0.005-1.0 part by weight of radical initiator at 150°-300° C. for several minutes to about one hour. If necessary, it may be incorporated with a phenol-based antioxidant such as BHT to prevent gelation. The above-mentioned maleic anhydride-modified ethylene-α-olefin copolymer rubber is not the only modified ethylene-α-olefin copolymer rubber that is used in the present invention. Maleic anhydride as the modifier may be replaced by a monomer selected from methyl acrylate, methyl methacrylate, allyl glycidyl ether, glycidyl methacrylate, and glycidyl acrylate. These monomers may also be used in combination with one another.

Moreover, the ethylene-α-olefin copolymer rubber may be used in combination with one or more species of other modified ethylene-α-olefin copolymer rubbers.

The modified ethylene-α-olefin copolymer rubber grafted with a styrene-based monomer may be prepared by the following process as well as the above-mentioned process. That is, an ethylene-α-olefin copolymer rubber in the form of small chips or pellets is dispersed into pure water together with a dispersing agent. Subsequently, the copolymer rubber is impregnated with a styrene-based monomer, and the reaction is performed by the aid of a radical initiator at 50°-150° C. for 1-5 hours. Thus there is obtained a modified ethylene-α-olefin copolymer rubber grafted with a styrene-based monomer.

According to the present invention, the rubbery substance as the component (c) should be used in an amount of 0-60 parts by weight for 100 parts by weight of the total amount of the components (a) and (b). The rubbery substance in excess of 60 parts by weight will impair the inherent outstanding properties of polyphenylene ether.

The resin composition of the present invention contains the component (d), which is an inorganic filler having an average particle diameter of 0.05-10 μm.

Examples of the inorganic filler include calcium carbonate, talc, clay, silica, magnesium carbonate, barium sulfate, titanium oxide, alumina, and gypsum. Preferable among them are talc and calcium carbonate.

With a particle diameter smaller than 0.05 μm, the inorganic filler is not so effective in improving the dimensional stability and stiffness of molded articles. With a particle diameter larger than 10 μm, the inorganic filler impairs the surface gloss of molded articles.

The inorganic filler as the component (d) should be used in an amount of 1-60 parts by weight for 100 parts by weight of the total amount of the components (a), (b), and (c). With the component (d) less than 1 part by weight, the resin composition does not provide molded articles having improved dimensional stability and stiffness. With the component (d) in excess of 60 parts by weight, the resin composition is poor in processability and provides molded articles having very low impact strength.

The resin composition of the present invention may contain any known melt flow improver as an optional component in addition to the above-mentioned components.

Preferred examples of the melt flow improver include white oil, liquid paraffin, low-molecular weight hydrocarbon resin, and low-molecular weight polyolefin, and modified products thereof.

White oil denotes a highly purified petroleum fraction which is a mixture of paraffin- and naphthene-based saturated hydrocarbons free of aromatic compounds, acids, sulfur-containing compounds, and other impurities.

Liquid paraffin is a product obtained from crude oil by atmospheric distillation and vacuum distillation, followed by the removing of unsaturated compounds, aromatic compounds, and sulfur.

The white oil and liquid paraffin should preferably have a viscosity of 40-400 (SUS second) measured at 37.8° C. according to JIS K-2283.

With a viscosity outside this range, they do not improve the melt flow properties of the resin composition sufficiently or they impair the mechanical properties of the resin composition considerably.

The low-molecular weight hydrocarbon resin includes petroleum resins, terpene-phenolic resins, terpene resins, rosin resins, coumarone-indene resins, aromatic hydrocarbon resins, alicyclic saturated hydrocarbon resins, and their hydrogenated and acid-modified products.

The above-mentioned petroleum resins are obtained by polymerizing the unsaturated hydrocarbon fractions having a boiling point of 20°-280° C., which are by-products obtained in the production of ethylene, propylene, butadiene, etc. from LPG, naphtha, kerosine, gas oil, heavy oil, or crude oil by thermal cracking (such as steam cracking, vapor phase thermal cracking, and sand cracking) or catalytic cracking.

The above-mentioned aromatic hydrocarbon resins denote aromatic hydrocarbon oligomers obtained by polymerizing a mixture of unsaturated aromatic hydrocarbons (represented by mixed vinyltoluenes and mixed vinylxylenes) which is obtained from naphtha, a product of petroleum cracking.

The above-mentioned coumarone-indene resins are derived from a mixture of unsaturated polycyclic aromatic hydrocarbons contained in the light oil fraction obtained from coal by dry distillation.

The above-mentioned terpene phenolic resins and terpene resins are derived from petroleum naphtha.

The above-mentioned rosin resins are polymers of rosin composed mainly of abietinic acid and dextropuric acid obtained by the steam distillation of terpentine secreted from pines.

The low-molecular weight hydrocarbon resin varies in molecular weight from one kind to another, ranging from 200 to 5000, preferably from 300 to 3000, more preferably from 350 to 2500.

The above-mentioned melt flow improvers may be used alone or in combination with one another.

The melt flow improver should be used in an amount of 0-50 parts by weight for 100 parts by weight of the total amount of the components (a), (b), and (c). With an amount outside this range, the melt flow improver will deteriorate the heat resistance of the resin composition.

The resin composition of the present invention may be incorporated with a variety of additives, according to need, during or after it production. The additives include an antioxidant, heat stabilizer, light stabilizer, flame retardant, slip agent, antistatic agent, inorganic and organic colorant, corrosion inhibitor, crosslinking agent, blowing agent, fluorescent agent, surface smoothing agent, and surface brightener.

The flame retardant useful for the resin composition of the present invention includes a series of compounds known to those skilled in the art. Particularly important among them are those which contain a specific element such as bromine, chlorine, antimony, phosphorus, and nitrogen, which imparts flame retardance. Examples of the flame retardant include halogenated organic compounds, antimony oxide, a mixture of antimony oxide and halogenated organic compound, a mixture of antimony oxide and phosphorus compound, phosphorus (as a simple substance), phosphorus compounds, and a mixture of halogen-containing compound and phosphorus compound or a compound having the phosphorus-nitrogen bond. They may be used in combination with one another.

The flame retardant should be used in an amount which is not necessarily critical but should be enough to impart flame retardance to the resin composition. With an excessive amount, it will lower the softening point and deteriorate other physical properties of the resin composition. Therefore, the adequate amount of the flame retardant should be 0.5–50 parts by weight, preferably 1–25 parts by weight, and more preferably 3–15 parts by weight, for 100 parts by weight of polyphenylene ether as the component (a) or the resin composition containing polyphenylene ether.

The halogen-containing compounds useful as flame retardants are represented by the formula below.

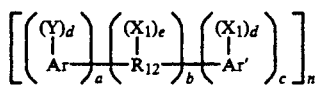

where
n is 1 to 10;
$R_{12}$ is selected from alkylene (such as methylene, ethylene, propylene, isopropylene, butylene, isobutylene, amylene), alkylidene (such as isopropylidene), alicyclic group (such as cyclohexylene and cyclopentylidene), ether, carbonyl, amine, sulfur-containing group (such as sulfide, sulfoxide, and sulfone), carbonate, and phosphorus-containing group;
$R_{12}$ may be composed of two or more alkylene or alkylidene groups connected by an aromatic, amino, ether, ester, carbonyl, sulfide, sulfoxide, sulfone, or phosphorus-containing group;
Ar and Ar', which may be same or different, each denotes a monocyclic or polycyclic carbocyclic aromatic group such as phenylene, biphenylene, terphenylene, and naphthylene;
Y denotes a substituent group selected from organic groups, inorganic groups, and organometallic groups, which includes (1) a halogen (such as chlorine, bromine, iodine, and fluorine), (2) an ether group represented by the formula of —OE (where E denotes a monovalent hydrocarbon group as defined by $X_1$ below), (3) an —OH group, (4) a monovalent hydrocarbon group, and (5) a nitro group and cyano group, with two or more Y's being the same or different for the subscript d greater than 2;
$X_1$ denotes a monovalent hydrocarbon group selected from alkyl groups (such as methyl, ethyl, propyl, isopropyl, butyl, and decyl), aryl groups (such as phenyl, naphthyl, biphenyl, xylyl, and tolyl), aralkyl groups (such as benzyl and ethylphenyl), alicyclic groups (such as cyclopentyl and cyclohexyl), and monovalent hydrocarbon groups containing an inert substituent group, with two or more $X_1$'s being the same or different for the subscript e greater than 2;
the subscript d denotes an integer from 1 to the number of substitutable hydrogen atoms on the aromatic ring represented by Ar or Ar';
the subscript e denotes an integer from 0 to the number of substitutable hydrogen atoms on the group represented by $R_{12}$;
the subscripts a, b, and c each denotes an integer including 0, provided that neither a nor c is 0 unless b is 0, and either a or c may be 0 if b is 0;
the aromatic groups are connected to each other directly through a carbon-carbon bond when b is 0; and
the hydroxyl groups or substituent groups Y on the aromatic groups Ar and Ar' may be at any of the ortho, meta, and para positions.

Examples of the compound represented by the general formula above include the following.

2,2-bis-(3,5-dichlorophenyl)-propane,
bis-(2-chlorophenyl)-methane,
1,2-bis-(2,6-dichlorophenyl)-ethane,
1,1-bis-(4-iodophenyl)-ethane,
1,1-bis-(2-chloro-4-iodophenyl)-ethane,
1,1-bis-(2-chloro-4-methylphehyl)-ethane,
1-bis-(3,5-dichlorophenyl)-ethane,
2,2-bis-(3-phenyl-4-bromophenyl)-ethane,
2,3-bis-(4,6-dichloronaphthyl)-propane,
2,2-bis-(2,6-dichlorophenyl)-pentane,
2,2-bis-(3,5-dichlorophenyl)-hexane,
bis-(4-chlorophenyl)-phenylmethane,
bis-(3,5-dichlorophenyl-cyclohexylmethane,
bis-(4-hydroxy-2,6-dichloro-3-methoxyphenyl)-methane,
2,2-bis-(3,5-dibromo-4-hydroxyphenyl)-propane,
2,2-bis-(3,5-dichloro-4-hydroxyphenyl)-propane, and
2,2-bis-(3-bromo-4-hydroxyphenyl)-propane.

Additional examples include tetrabromobenzene, hexachlorobenzne, hexabromobenzene, 2,2'-dichlorobiphenyl, 2,4'-dibromobiphenyl, 2,4'-dichlorobiphenyl, hexabromobiphenyl, octabromobiphenyl, decabromobiphenyl, halogenated diphenyl ethers containing 2–10 halogen atoms, and oligomers having a degree of polymerization of 1 to 20 which are formed from 2,2-bis-(3,5-dibromo-4-hydroxyphenyl)-propane and phosgene.

The halogenated compounds which are favorably used as flame retardants in the present invention are halogenated aromatic compounds (such as chlorobenzenes, bromobenzenes, chlorobiphenyls, chloroterphenyls, bromobiphenyls, and bromoterphenyls); compounds containing two phenyl nuclei separated by a divalent alkylene group, said phenyl nuclei each having at least two chlorine or bromine atoms; and mixtures thereof Preferable among them are hexabromobenzene, chlorobiphenyl and chloroterphenyl, and a mixture thereof with antimony oxide.

The typical phosphoric compound which is favorably used as the flame retardant in the present invention is a phosphate ester represented by the formula below.

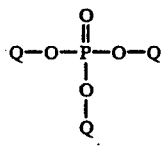

(where Q denotes independently the same or different group which includes a hydrocarbon group (such as alkyl, cycloalkyl, aryl, alkyl-substituted aryl, and aryl-substituted alkyl), halogen, hydrogen, or a combination thereof), and a nitrogen-containing compound similar to that represented by the formula above.

Preferred examples of the phosphate ester include the following.

Phenyl bisdodecyl phosphate,
phenyl bisneopentyl phosphate,
hydrogen phenyl ethylene phosphate,
phenyl bis-(3,5,5'-trimethylhexyl) phosphate,
ethyl diphenyl phosphate,
2-ethylhexyl di-(p-tolyl) phosphate,
hydrogen diphenyl phosphate,
bis-(2-ethylhexyl) p-tolyl phosphate,
tritolyl phosphate,
bis-(2-ethylhexyl) phenyl phosphate,
tri(nonylphenyl) phosphate,
hydrogen phenyl methyl phosphate,
di(dodecyl) p-tolyl phosphate,
triphenyl phosphate,
halogenated triphenyl phosphate,
dibutyl phenyl phosphate,
2-chloroethyl diphenyl phosphate,
p-tolyl bis-(2,5,5'-trimethylhexyl) phosphate,
2-ethylhexyl diphenyl phosphate, and
hydrogen diphenyl phosphate.

Preferable among them is triphenyl phosphate. It may be used in combination with hexabromobenzene or antimony oxide.

Additional examples of the flame retardants include compounds having the phosphorus-nitrogen bond, such as phosphorus nitride chloride, phosphoric ester amide, phosphoric acid amide, phosphine amide, tris(aziridinyl) phosphine oxide, and tetrakis(hydroxymethyl) phosphonium chloride.

The thermoplastic resin composition of the present invention may be produced by any known process which is not specifically limited. For example, it may be effectively produced by mixing the components in solution form and evaporating the solvent or precipitating the mixture in a non-solvent. However, mixing in the molten state is desirable from the standpoint of commercial production. The melt-mixing can be carried out using an ordinary single-screw extruder, twin-screw extruder, or kneader. A twin-screw extruder of high shear type is preferable.

Prior to melt-mixing, the components should preferably be uniformly mixed in the form of powder or pellets using a tumbler or Henschel mixer. However, this preliminary mixing may be omitted; instead, the individual components may be directly metered into the mixing machine.

After mixing, the resin composition is ready for injection molding, extrusion molding, press molding, blow molding, etc. However, it is also possible to eliminate the mixing step, in which case the individual components are dry-blended and the resulting dry blend is fed directly into a molding machine which melts and mixes the components, yielding the desired molded articles.

The sequence of mixing is not specifically limited. Thus, the components (a), (b), (c), and (d) may be mixed all at once. Alternatively, the components (a) and (b) are mixed first and the resulting mixture is mixed with the components (c) and (d). Other mixing sequences will be possible.

The thermoplastic resin composition of the present invention is superior in processability and can be made into molded articles, sheet, laminate, etc, by injection molding, extrusion molding, press molding, and blow molding. The molded articles have good impact resistance, heat resistance, stiffness, dimensional stability, paintability, appearance, and smoothness.

The molded articles will find use as automotive parts such as bumper, instrument panel, fender, trim, door panel, wheel cap, side protector, side seal garnish, trunk lid, hood, quarter panel, air intake, lower apron, spoiler, front grille, radiator grille, mirror housing, air cleaner, core material of seat, glove box, console box, cooling fan, sirocco fan, brake oil tank, lamp housing, roof, and other interior and exterior parts. They will also find use as machine parts which need heat resistance. Other possible uses include motorcycle parts (such as covering material, muffler cover, and leg shield), electric and electronic parts (such as housing, chassis, connector, printed circuit board, and pulley), and other parts which need strength and heat resistance.

EXAMPLES

The invention will be described in more detail with reference to the following examples, which are illustrative only and are not intended to limit the scope of the invention. In the examples, the test for deflection temperature under load (H.D.T.) was performed according to JIS K7202, the Izod impact strength (3.2 mm thick) was measured according to JIS K7110, and the reduced viscosity ($\eta sp/C$) of polyphenylene ether was measured in chloroform (0.5 g/dl solution at 25° C., and the unit of it is dl/g.

The resin composition was mixed using a twin-screw extruder (at 270°-300° C.). The resulting resin composition was injection-molded into test pieces for measurement of physical properties.

In Examples and Comparative Examples, the resin compositions were prepared from the components (a), (b), (c), and (d) which are explained in the following.
Component (a): Polyphenylene ether This was selected form four kinds of polyphenylene ether (designated as A-1, A-2, A-3, and A-4) each havinga reduced viscosity ($\eta sp/C$) of 0.37, 0.63, 0.20, and 0.53, respectively, which were commercially available from Nippon Polyether Co., Ltd.

COMPONENT (a): MODIFIED POLYPHENYLENE ETHER (i) This is maleic anhydride-modified polyphenylene ether (designated as A-5) in pellet form, which was prepared by mixing 3 kg of poly-2,6-diemthylphenylene ether ($\eta sp/C = 0.35$) with 78 g of styrene, 110 g of maleic anhydride, and 35 g of dicumyl peroxide in a Henschel mixer, and kneading the mixture at 300°-320° C. in a twin-screw extruder, followed by pelletization.

(ii) This is glutaric acid-modified polyphenylene ether (designated as A-6), which was prepared in the same manner as in (i) above except that maleic anhydride was replaced by glutaric acid.

COMPONENT (b): MODIFIED PROPYLENE POLYMER (i) This is a styrene-grafted propylene polymer (designated as B-1), which was prepared by reacting 10 kg of commercial propylene polymer in pellet form ("Sumitomo Noblen AV585", having a melt index (MI) of 5.0, available from Sumitomo Chemical Co., Ltd.) with 4.2 kg of styrene in a 100-liter autoclave containing 40 liters of water, 70 g of dispersing agent ("Metholose 90SH-100"), and a peroxide ("Perbutyl PV"), at 110° C. for about 1 hour, while blowing nitrogen, followed by cooling.

(ii) This is a styrene-grafted propylene polymer (designated as B-2), which was prepared in the same manner as in (i) above except that the amount of styrene was changed to 0.8 kg.

(iii) This is a styrene-grafted propylene polymer (designated as B-3), which was prepared int eh following manner. First, 100 parts by weight of propylene polymer pellets ("Sumitomo Noblen AV585" available from Sumitomo Chemical Co., Ltd.) was mixed with 0.7 part by weight of vinylcycloalkane (a nucleating agent disclosed in Example in Japanese Patent Laid-open No. 234462/1989), 0.1 part by weight of BHT (as a stabilizer), 0.1 part by weigh of calcium stearate, and 0.07 part by weight of "Irganox 1010" (made by Ciba-Geigy Corp.) by dry-blending, and the mixture was pelletized using a 40-mmφ extruder at a cylinder temperature of 260° C. Secondly, 10 kg of the pellets was placed in an autoclave together with 2.3 kg of styrene, 6g of dispersing agent ("Metholose 90SH-100"), and a peroxide ("Perbutyl PV"). Reaction was carried out at 120° C. for about 1 hour while blowing nitrogen. After cooling, the desired product was recovered by extracting polystyrene with methyl ethyl ketone.

(iv) This is a propylene polymer grafted with styrene and glycidyl methacrylate (designated as B-4), which was prepared by reacting 100 parts by weight of propylene polymer in pellet form ("Sumitomo Noblem H501" [MI=3.5], available from Sumitomo Chemical Co., Ltd.) with 9 parts by weight of styrene and 2 pars by weight of glycidyl acrylate in an autoclave containing 400 parts by weight of water, 0.8 part by weight of dispersing agent ("Metholose 90SH-100"), and a peroxide ("Perbutyl PV"), at 120° C. for about 1 hour, while blowing nitrogen, followed by cooling.

(v) This is a propylene polymer grafted with styrene, glycidyl methacrylate, and glycidyl acrylate (designated as B-5), which was prepared by reacting 10 kg of propylene polymer in pellet form ("Sumitomo Noblen FS1012" [MI=1.0], available from Sumitomo Chemical Co., Ltd.) with 700 g of styrene, 460 g of glycidyl methacrylate, and 80 g of glycidyl acrylate in a 100-liter autoclave containing 30 liters of water, 80 g of dispersing agent ("Metholose 90SH-100"), and a peroxide ("Perbutyl PV"), at 120° C. for about 1 hour, while blowing nitrogen, followed by cooling.

(vi) This is a styrene-grafted propylene polymer (designated as B-6), which was prepared by mixing 100 parts by weight of propylene polymer ("Sumitomo Noblen AW564" [MI=9.0], available from Sumitomo Chemical Co., Ltd.) with 2.9 parts by weight of maleic anhydride, 3.2 parts by weight of styrene, 0.7 part of radical initiator (*), and 0.1 part by weight of stabilizer ("Irganox 1010" made by Ciba-Geigy Corp.) in a Henschel mixer, and kneading the mixture in a twin-screw extruder at 230° C. (*) 1,3-bis(t-butyl peroxyisopropyl)benzene ("Sunperox TY1-3", made by Sanken Kako Co., Ltd.) loaded (6 wt %) on propylene homopolymer.

COMPONENT (c): RUBBERY SUBSTANCE (i) This is a modified ethylene-propylene-diene rubber (designated as EP-1), which was prepared in the following manner. In a stainless steel autoclave equipped with a stirrer were placed 100 parts by weight of ethylene-propylene copolymer rubber (in small pieces) ("Sumitomo Esprene E201", $ML_{1+4}$ (100° C.)=45, available from Sumitomo Chemical Co., Ltd.), 350 parts by weight of water, 4.0 parts by weight of calcium tertiary phosphate, and 4.0 parts by weight of "Pluronic F-68" (made by Asahi Denka Kogyo Co., Ltd.). The atmosphere in the autoclave was completely replaced with nitrogen while stirring the reactants. To the autoclave were added 8 parts by weight of styrene and 0.9 part by weight of radical initiator ("Sunperox TO" made by Sanken Kako Co., Ltd.). The reactants were heated to 110° C. over 70 minutes, and reaction was performed for 1 hour. After cooling, the reaction product (styrene-grafted copolymer rubber) was filtered out and washed thoroughly with water and vacuum-dried.

(ii) This is a modified ethylene-propylene-diene rubber (designated as C-1), which was prepared in the following manner. In a stainless steel autoclave equipped with a stirrer were placed 100 parts by weight of ethylene-propylene-diene copolymer rubber (in small pieces) ("Sumitomo Esprene E606", $ML_{1+4}$ (121° C.)=70, available from Sumitomo Chemical Co., Ltd.), 350 parts by weight of water, 4.0 parts by weight of calcium tertiary phosphate, and 4.0 parts by weight of "Pluronic F-68" (made by Asahi Denka Kogyo Co., Ltd.). The atmosphere in the autoclave was completely replaced with nitrogen while stirring the reactants. To the autoclave were added 33 parts by weight of styrene, 45 parts by weight of glycidyl methacrylate, and 0.5 part by weight of "Sunperox TO" (made by Sanken Kako Co., Ltd.) as a radical initiator. The reactants were heated to 110° C. over 70 minutes, and reaction was performed for 1 hour. After cooling, the reaction product (styrene- and glycidyl methacrylate-grafted copolymer rubber) was filtered out and washed thoroughly with water and vacuum-dried.

(iii) This is a modified ethylene-propylene copolymer rubber (designated as C-2), which was prepared in the following manner. First, 100 parts by weigh of ethylene-propylene copolymer rubber (in pellets) ("Sumitomo Esprene E201", $ML_{1+4}$ (100° C.)=45, available from Sumitomo Chemical Co., Ltd.) was mixed with 5.1 parts by weight of maleic anhydride, 3.1 parts by weight of styrene, 1.9 parts of radical initiator (*) in a Henschel mixer. Then the mixture as kneaded in a twin-screw extruder (Model TEX44SS-30BW-2V made by Japan Steel Works, Ltd.) at 250° C. in a nitrogen atmosphere at a throughput of 18 kg/hr. (*) 1,3-bis(t-butyl peroxyisopropyl)benzene ("Sunperox TY1-3", made by Sanken Kako Co., Ltd.) loaded (6 wt %) on propylene homopolymer.

(iv) This is a modified ethylene-butene rubber (designated as C-3), which was prepared in the following manner. In a stainless steel autoclave equipped with a stirrer were placed 100 parts by weight of ethylene-butene copolymer rubber (in small pieces) ("Tafmer A4085", available from Mitsui Petrochemical Industry, Ltd.), 350 parts by weight of water, 4.0 parts by weight of calcium tertiary phosphate, and 4.0 parts by weigh of "Pluronic F-68" (made by Asahi Denka Kogyo Co., Ltd.). The atmosphere in the autoclave was completely replaced with nitrogen while stirring the reactants. To the autoclave were added 41 parts by weight of styrene and 0.9 part by weight of radical initiator ("Sunperox TO" made by Sanken Kako Co., Ltd.). The reactants were heated to 110° C. over 70 minutes, and reaction was performed for 1 hour. After cooling, the reaction product (styrene-grafted copolymer rubber) was filtered out and washed thoroughly with pure water and vacuum-dried.

(v) Other rubbery substances selected from the following commercial products.

Styrene-ethylene-butylene block copolymer, "Kraton G1657X" available from Shell Chemical Co., Ltd. (Designated as C-4.)

Styrene-isoprene block copolymer, "Kraton D1320X" available from Shell Chemical Co., Ltd. (Designated as C-5.)

Styrene-butadiene rubber, $ML_{1+4}$ (100° C.)=52, "Sumitomo SBR 1502" available from Sumitomo Chemical Co., Ltd. (Designated as C-6.)

Styrene-butadiene block copolymer, "Cariflex TR1300" available from Shell Chemical Co., Ltd. (Designated as C-7.)

Styrene-ethylene-propylene block copolymer, "Kraton G1701X" available from Shell Chemical Co., Ltd. (Designated as C-8.)

Ethylene-propylene rubber, $ML_{1+4}$ (100° C.)=45, "Sumitomo Esprene E201" available from Sumitomo Chemical Co., Ltd. (Designated as C-9.)

Polybutadiene, "Diene 35A" available from Asahi Chemical Industry Co., Ltd. (Designated as C-10.)

Chloroprene rubber, "Neoprene W" available from Showa Neoprene Co., Ltd. (Designated as C-11.)

Ethylene-epoxy acrylate copolymer, "Bondfast 2C" available from Sumitomo Chemical Co., Ltd. (Designated as C-12.)

Ethylene-alkyl acrylate-maleic anhydride copolymer, "Bondine AX8390" available from Sumitomo Chemical Co. Ltd. (Designated as C-13.)

Ethylene-propylene-diene rubber, $ML_{1+4}$ (100° C.)=53, "Sumitomo Esprene E507" available from Sumitomo Chemical Co., Ltd. (Designated as C-14.)

Natural rubber (Designated as C-15.)

COMPONENT (d): INORGANIC FILLER (i) Talc (average particle diameter=1.7 μm), designated as D-1.

(ii) Talc (average particle diameter=5.2 μm), designated as D-2.

(iii) Talc (average particle diameter=8.6 μm), designated as D-3.

(iv) Talc (average particle diameter=16.0 μm), designated as D-4.

(v) Calcium carbonate (average diameter=0.03 μm), designated as D-5.

(vi) Calcium carbonate (average diameter=2.1 μm), designated as D-6.

EXAMPLES 1 TO 4 AND COMPARATIVE EXAMPLES 1 TO 4

Various kinds of resin compositions were prepared from the components (a), (b), (c), and (d) whose designations and amounts are shown in Table 1. They were tested for physical properties using their injection-molded test pieces. The results are shown in Table 1. It is noted that the resin compositions superior in heat resistance, stiffness, and impact resistance are obtained from polyphenylene ether, modified propylene polymer, propylene polymer, rubbery substance, and inorganic filler having an average diameter of 0.05–10 μm.

EXAMPLES 5 TO 10 AND COMPARATIVE EXAMPLE 5

Various kinds of resin compositions were prepared from the components (a), (b), (c), and (d) and an optional component whose designations and amounts are shown in Table 2. They were tested for physical properties using their injection-molded test pieces. The results are shown in Table 2. It is noted that the resin compositions superior in heat resistance, stiffness, and impact resistance are obtained from polyphenylene ether, modified propylene polymer, rubbery substance, inorganic filler having an average diameter of 0.05–10 μm, and optional component.

EXAMPLES 11 TO 16 AND COMPARATIVE EXAMPLES 6 TO 7

Various kinds of resin compositions were prepared from the components (a), (b), (c), and (d) and a flow improver whose designations and amounts are shown in Table 3. They were tested for physical properties and paintability using their injection-molded test pieces. The results are shown in Table 3.

Procedure for paintability test: A test piece measuring 150 mm (L)×90 mm (W)×2 mm (T) was prepared from the resin composition using a 3-ounce injection molding machine at a resin temperature of 230° C. This test piece was washed with 1,1,1-trichloroethane vapor (74° C.) for 30 seconds, followed by drying at room temperature. The washed test piece was coated by spraying with a urethane paint ("Flexen #101" made by Nippon Bee Chemical Co., Ltd.), followed by baking in an oven at 120° C. for 30 minutes. After standing for 24 ours, the coated test piece was subjected to cross-cut test. In this test, 100 squares, in 2 mm square, were cut into the coating film. A piece of 24-mm wide cellophane tape ("Cellotape" made by Nichiban Co., Ltd.) was applied over the squares by pressing with a finger tip and then rapidly pulled off. The number of squares of paint unremoved was indicated in percent (%). The results are shown in Table 3.

It is noted that the resin composition superior in heat resistance, stiffness, and impact resistance are obtained from polyphenylene ether, modified propylene polymer, rubbery substance, inorganic filler having an average diameter of 0.05–10 μm, and optional flow improver.

It is also noted that the resin compositions containing the modified polyphenylene ether have greatly improved paintability.

TABLE 1

| | Resin composition (parts by weight) | | | | | Physical properties | | | |
| | Component (a) | Component (b) | | Component (c) | Component (d) | HDT | Flexural | Izod impact | |
| Example No. | | Modified | | | | (4.6 kg, | modulus | (kg · cm/cm) | |
| (Comparative | Polyphenylene | propylene | Propylene | Rubbery | Inorganic | | | | |
| Example No.) | ether | polymer | polymer*1 | substance | filler | °C.) | (kg/cm²) | −30° C. | 23° C. |
| 1 | A-1 (30) | B-1 (30) | 20 | C-9 (12) | D-1 (8) | 133 | 14000 | 9 | 20 |
| 2 | A-1 (30) | B-1 (30) | 20 | C-1 (6) C-7 (6) | D-1 (8) | 130 | 13900 | 11 | 23 |
| 3 | A-1 (30) | B-2 (30) | 20 | C-4 (9) C-12 (3) | D-3 (8) | 131 | 13500 | 8 | 18 |
| 4 | A-1 (30) | B-3 (30) | 20 | EP-1 (12) | D-1 (8) | 136 | 14900 | 7 | 17 |
| (1) | A-1 (30) | B-1 (30) | 20 | C-9 (12) | D-4 (8) | 128 | 13000 | 3 | 8 |
| (2) | A-2 (30) | B-1 (30) | 20 | C-9 (12) | D-4 (8) | 123 | 13600 | 5 | 10 |

TABLE 1-continued

| Example No. (Comparative Example No.) | Component (a) Polyphenylene ether | Component (b) Modified propylene polymer | Propylene polymer*1 | Component (c) Rubbery substance | Component (d) Inorganic filler | HDT (4.6 kg, °C.) | Flexural modulus (kg/cm²) | Izod impact (kg · cm/cm) −30° C. | Izod impact (kg · cm/cm) 23° C. |
|---|---|---|---|---|---|---|---|---|---|
| (3) | A-3 (30) | B-1 (30) | 20 | C-9 (12) | D-4 (8) | 117 | 12500 | 4 | 9 |
| (4) | A-1 (30) | B-2 (30) | 20 | C-4 (9) C-12 (3) | 0 | 130 | 12100 | 10 | 21 |

*1 Propylene polymer, MI = 30 (230° C., 2.16 kg): "Sumitomo Noblen AZ564" made by Sumitomo Chemical Co., Ltd.

TABLE 2

| Example No. (Comparative Example No.) | Component (a) Polyphenylene ether | Component (b) Modified propylene polymer | Component (c) Rubbery substance | Component (d) Inorganic filler | Other component | HDT (4.6 kg, °C.) | Flexural modulus (kg/cm²) | Izod impact (kg · cm/cm) −30° C. | Izod impact (kg · cm/cm) 23° C. |
|---|---|---|---|---|---|---|---|---|---|
| 5 | A-4 (13) | B-4 (67) | C-14 (9) | D-6 (11) | 0 | 109 | 10900 | 9 | 15 |
| 6 | A-1 (9) A-4 (18) | B-5 (51) | C-8 (7) C-6 (4) | D-6 (11) | 0 | 126 | 12800 | 11 | 18 |
| 7 | A-1 (9) A-4 (18) | B-5 (51) | 0 | D-6 (11) | 0 | 133 | 13700 | 4 | 9 |
| 8 | A-4 (20) | B-2 (47) | C-4 (10) C-15 (3) | D-3 (14) | 6*1 | 122 | 13300 | 12 | 30 |
| 9 | A-4 (20) | B-2 (47) | C-8 (9) EP-1 (4) | D-3 (14) | 6*1 | 124 | 13600 | 10 | 25 |
| 10 | A-4 (20) | B-2 (47) | C-5 (7) C-7 (6) | D-3 (14) | 6*2 | 120 | 13000 | 15 | 32 |
| (5) | A-4 (13) | B-4 (67) | C-14 (9) | D-5 (11) | 0 | 107 | 8800 | 7 | 16 |

*1 Ethylene-butene copolymer, "Sumitomo Excellen CN1007" made by Sumitomo Chemical Co., Ltd.
*2 Ethylene-butene copolymer, "Sumitomo Excellen CN3001" made by Sumitomo Chemical Co., Ltd.

TABLE 3

| Example No. (Comparative Example No.) | Component (a) Polyphenylene ether | Component (b) Modified propylene polymer | Component (c) Rubbery substance | Component (d) Inorganic filler | Flow improver | HDT (4.6 kg, °C.) | Flexural modulus (kg/cm²) | Izod impact (kg · cm/cm) −30° C. | Izod impact (kg · cm/cm) 23° C. | MI*1 (g/10 min) | Paintability ratio (%) |
|---|---|---|---|---|---|---|---|---|---|---|---|
| 11 | A-5 (52) | B-5 (28) | C-2 (7) C-1 (3) | D-2 (10) | 0 | 154 | 15200 | 11 | 19 | 9 | 97 |
| 12 | A-5 (52) | B-5 (28) | C-4 (8) C-11 (2) | D-2 (10) | 0 | 149 | 14900 | 13 | 21 | 11 | 95 |
| 13 | A-6 (52) | B-6 (28) | C-2 (7) C-10 (3) | D-2 (10) | 0 | 156 | 15800 | 9 | 17 | 14 | 98 |
| 14 | A-6 (52) | B-6 (20) B-4 (8) | C-1 (8) C-13 (2) | D-2 (10) | 5*2 3*3 | 140 | 13400 | 7 | 13 | 25 | 96 |
| 15 | A-4 (52) | B-6 (28) | C-12 (7) C-15 (3) | D-2 (10) | 8*4 | 148 | 15000 | 11 | 20 | 29 | 84 |
| 16 | A-1 (52) | B-1 (28) | C-9 (10) | D-2 (10) | 0 | 151 | 15000 | 7 | 16 | 13 | 81 |
| (6) | A-6 (52) | B-6 (20) B-4 (8) | C-1 (8) C-13 (2) | D-4 (10) | 5*2 3*3 | 132 | 13200 | 2 | 6 | 11 | 72 |
| (7) | A-3 (52) | B-2 (28) | C-5 (10) | D-4 (10) | 0 | 121 | 13800 | 4 | 8 | 7 | 80 |

*1 260° C., 10 kg,
*2 Hydrogenated terpene resin, "Clearon P-125" made by Yasuhara Yushi Co., Ltd.
*3 Liquid paraffin, "W-oil CP-50" made by Idemitsu Kosan Co., Ltd.
*4 White oil, "Britol" made by Witco Co., Ltd.

EFFECT OF THE INVENTION

As mentioned above, the present invention provides a thermoplastic resin composition which exhibits not only good moldability but also well-balanced physical properties. The resin composition can be easily processed into molded articles by injection molding, extrusion molding, press molding, and blow molding, which are normally used for polyphenylene ether-based thermoplastic resin compositions. The resulting molded articles have outstanding impact resistance, heat resistance, stiffness, dimensional stability, paintability, and uniform appearance and smoothness.

What is claimed is:

1. A thermoplastic resin composition comprising:
   (a) a polyphenylene ether or a composition containing a polyphenylene ether,
   (b) (i) a modified propylene polymer obtainable by grafting a propylene polymer with a styrene-based monomer alone or in combination with a monomer copolymerizable with a styrene-based monomer, or
   (ii) a composition composed of said modified propylene polymer and a propylene homopolymer or a propylene copolymer,
   (c) a rubbery substance, and
   (d) an inorganic filler having an average particle diameter of 0.05–10 μm.

2. A thermoplastic resin composition comprising:
   (a) a polyphenylene ether or a composition containing a polyphenylene ether, (b) (i) a modified propylene polymer obtainable by grafting a propylene polymer with a styrene-based monomer alone or in combination with a monomer copolymerizable with a styrene-based monomer, or (ii) a composition composed of said modified propylene polymer and a propylene homopolymer or a propylene copolymer, (c) a rubbery substance, and (d) an inorganic filler having an average particle diameter of 0.05–10 μm, with the ratio of component (a) to component (b) being 1–90 wt % to 99–10 wt %, the amount of component (c) being 0–60 parts by weight for 100 parts by weight of the total amount of components (a) and (b), and the amount of component (d) being 1–60 parts by weight for 100 parts by weight of the total amount of components (d), (b), and (c).

3. A thermoplastic resin composition as claimed in claim 1 or claim 2, wherein the polyphenylene ether as component (a) is one which is obtained by the oxidative coupling polymerization of one or more than one phenol compound represented by the formula below:

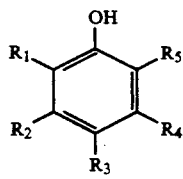

where $R_1$, $R_2$, $R_3$, $R_4$, and $R_5$ each independently denotes a hydrogen atom, a halogen atom, a hydrocarbon group or substituted hydrocarbon group, or a hydrocarbyloxy group or substituted hydrocarbyloxy group; and at lest one of $R_1$ to $R_5$ is invariably a hydrogen atom.

4. A thermoplastic resin composition as claimed in claim 1 or claim 2, wherein the propylene polymer int he component (b) is a highly crystalline propylene homopolymer or propylene block copolymer in which the homopolymer unit contains boiling heptane insolubles whose isotactic pentad ratio is higher than 0.970.

5. A thermoplastic resin composition as claimed in claim 1 or claim 2, wherein the propylene polymer in the component (b) is a highly crystalline propylene homopolymer or propylene block copolymer in which the homopolymer unit contains boiling heptane insolubles whose isotactic pentad ratio is higher than 0.970 and also contains less than 5.0 wt % of heptane solubles and less than 2.0 wt % of xylene solubles (20° C.).

6. A thermoplastic resin composition as claimed in claim 1 or claim 2, wherein the propylene polymer composition as component (b) is one which is obtained by blending a propylene polymer with 0.05–10000 ppm (by weight) of vinylcycloalkane having 6 or more carbon atoms.

7. A thermoplastic resin composition as claimed in claim 1 or claim 2, wherein the rubbery substance as component (c) is at least one member selected form the groups consisting of ethylene-α-olefin copolymer or modified products thereof, ethylene-propylene-unsaturated diene rubbers, butadiene-styrene copolymers or hydrogenated products thereof, and epoxy-group containing copolymers.

8. A thermoplastic resin composition as claimed in claimed in claim 7, wherein the ethylene-αolefin copolymer rubber is one which contains 15–85 wt % of ethylene and has a Mooney viscosity ($ML_{1+4}$, 121° C.) of 5–120 and a glass transition point lower than −10° C.

9. A thermoplastic resin composition as claimed in claim 1 or claim 2, wherein the inorganic filler as component (d) is at least one member selected form the group consisting of talc and calcium carbonate.

10. Molded articles which are made of the thermoplastic resin composition claimed in claim 1 or claim 2.

11. Automotive parts which are made of the thermoplastic resin composition claimed in claim 1 or claim 2.

12. Automotive parts as claimed in claim 11 which include bumper, instrument panel, fender, trim, door panel, wheel cap, side protector, side seal garnish, trunk lid, hood, quarter panel, air intake, lower apron, spoiler, front grille, radiator grille, mirror housing, air cleaner, core material of seat, glove box, console box, cooling fan, sirocco fan, brake oil tank, lamp housing, and roof.

13. A thermoplastic resin composition as claimed in claim 1 or claim 2, wherein the rubbery substance as component (c) is at least one member selected from the groups consisting of ethylene-α-olefin copolymer or modified products thereof, modified products of ethylene-propylene-unsaturated diene rubbers, butadiene-styrene copolymers or hydrogenated products thereof, and epoxy-group containing copolymers.

* * * * *